(12) United States Patent
Shinojima et al.

(10) Patent No.: US 6,770,008 B2
(45) Date of Patent: Aug. 3, 2004

(54) CONTROLLER FOR EXHAUST BRAKE

(75) Inventors: Takumi Shinojima, Fujisawa (JP); Satoshi Kishi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/255,920

(22) Filed: Sep. 26, 2002

(65) Prior Publication Data

US 2003/0073539 A1 Apr. 17, 2003

(30) Foreign Application Priority Data

Oct. 15, 2001 (JP) ........................................ 2001-316818

(51) Int. Cl.[7] ............................................. B60K 41/02
(52) U.S. Cl. ........................................ 477/71; 477/172
(58) Field of Search ................................ 477/171, 172, 477/175, 160, 205, 206, 70, 71, 77, 109

(56) References Cited

U.S. PATENT DOCUMENTS

| | | | | |
|---|---|---|---|---|
| 4,495,576 A | * | 1/1985 | Ito ............................ | 477/63 X |
| 4,669,435 A | * | 6/1987 | Furusawa et al. ........... | 123/323 |
| 4,860,861 A | * | 8/1989 | Gooch et al. ............. | 74/731 X |
| 4,961,484 A | * | 10/1990 | Kato et al. ................. | 192/3.31 |
| 2002/0035010 A1 | * | 3/2002 | Kobayashi ................ | 477/71 X |

FOREIGN PATENT DOCUMENTS

| | | | | |
|---|---|---|---|---|
| JP | 363135644 A | * | 6/1988 | ................. 477/172 |
| JP | 05272636 | * | 10/1993 | ............. 477/175 X |
| JP | 409126315 A | * | 5/1997 | |

* cited by examiner

Primary Examiner—Roger Pang
(74) Attorney, Agent, or Firm—McCormick, Paulding & Huber LLP

(57) ABSTRACT

A controller for an exhaust brake device is provided whereby the braking force of the exhaust brake device can be ensured sufficiently, even at low vehicle speeds. A controller for an exhaust brake device (73) used in combination with a power transmission device comprising a fluid coupling (2) connected to the output shaft (1a) of an engine (E), a clutch (3) interposed between the fluid coupling (2) and a gearbox (T/M), and a lock-up clutch (7) for mechanically disengaging and engaging the fluid coupling (2), is provided, and this controller is provided with an electronic control unit (22) for controlling the engagement and disengagement of the lock-up clutch (7) and the operation of the exhaust brake device (73). The electronic control unit (22) permits operation of the exhaust brake device (73) in the range of engagement of the lock-up clutch (7).

3 Claims, 6 Drawing Sheets

FIG.4

| GEAR LEVEL | N | R | FIRST-SPEED | SECOND-SPEED | THIRD-SPEED | FORTH-SPEED | FIFTH-SPEED | SIXTH-SPEED |
|---|---|---|---|---|---|---|---|---|
| INPUT NUMBER OF REVOLUTIONS(rpm) | — | 900 | 900 | 900 | 900 | 900 | 900 | 900 |

FIG.5

| GEAR LEVEL | N | R | FIRST-SPEED | SECOND-SPEED | THIRD-SPEED | FORTH-SPEED | FIFTH-SPEED | SIXTH-SPEED |
|---|---|---|---|---|---|---|---|---|
| INPUT NUMBER OF REVOLUTIONS(rpm) | — | 800 | 800 | 800 | 800 | 700 | 700 | 700 |

CONTROLLER FOR EXHAUST BRAKE

CROSS REFERENCES TO RELATED APPLICATIONS

This application is entitled to the benefit of and incorporates by reference essential subject matter disclosed in Japanese Patent Application No. 2001-316818 filed Oct. 15, 2001.

BACKGROUND OF THE INVENTION

1. Field of the Invention

The present invention relates to a controller for an exhaust brake device which is combined with a power transmission device provided with a fluid coupling for transmitting the driving force of an engine to a gearbox, and a lock-up clutch for disengaging and engaging this fluid coupling, mechanically, and more particularly, it relates to a controller for an exhaust brake device which permits the exhaust brake device to be used in practice, even at low vehicle speed.

2. Description of the Related Art

An exhaust brake device used as a supplementary brake in a large vehicle, or the like, is principally constituted by an exhaust shutter provided in the exhaust path of the engine, a braking force being applied by actuating and closing the exhaust shutter so as to close the exhaust path.

Normally, in an manual transmission vehicle, an exhaust brake is used with the clutch in a fully engaged state and the accelerator in an non-pressed state (for example, in a state where the vehicle is descending a long downhill gradient).

In an automatic transmission vehicle which transmits the driving force of the engine to the gearbox by means of a fluid coupling, in cases where the lock-up clutch which mechanically disengages and engages the input and output sides of the fluid coupling is in a disengaged state, then even if the exhaust brake device is operated, slipping will occur in the fluid coupling, and no braking force will be obtained.

In particular, since the automatic transmission of an automatic transmission vehicle changes gear frequently at low speed, in practice, it is not possible to engage the lock-up clutch. In other words, if the lock-up clutch is engaged at low speed, then it is necessary to disengage and reengage the lock-up clutch each time the gear is changed, thereby impairing the sensation transmitted to the driver, and hence the lock-up clutch has to be engaged once the vehicle speed has been raised to a relative degree (in general, a high sensation of gear changing is required in automatic transmission vehicles).

From the foregoing, in an automatic transmission vehicle, the lock-up clutch has been engaged at medium speeds (for example, 40 km/h). Therefore, at low speed (for example, below 40 km/h), a problem arises in that no braking force is obtained even if the exhaust brake device is activated.

Moreover, whilst it is necessary to close the accelerator completely in order to activate the exhaust brake, in an automatic transmission vehicle, after starting off, an accelerating operation which reciprocates the braking is performed, namely, the gear is shifted up whilst releasing the accelerator, when the vehicle is accelerating at low speed, and therefore, it has not conventionally been possible to use an exhaust brake at low speed.

However, if the exhaust brake device is operated in a semi-compulsory manner at a low vehicle speed where the lock-up clutch is disengaged, in spite of the foregoing, then although the indicator panel will indicate to the driver that the exhaust brake is operating, no exhaust braking force will actually be obtained, and hence there will be a disparity between the driver's perceptions and the operational indications.

SUMMARY OF THE INVENTION

Therefore, it is an object of the present invention to resolve the aforementioned problems, by providing a controller for an exhaust brake device whereby the exhaust brake device can be used in practice at low vehicle speeds.

In order to achieve the aforementioned object, the present invention is a controller for an exhaust brake device combined with a power transmission device provided with a fluid coupling connected to the output shaft of an engine, a friction-type gear change clutch interposed between said fluid coupling and a gearbox, and a lock-up clutch provided in said fluid coupling for mechanically disengaging and engaging the input and output side of said fluid coupling; comprising: an electronic control unit for controlling the engagement and disengagement of said friction-type gear change clutch, the engagement and disengagement of said lock-up clutch, and the operation of said exhaust brake device; wherein said electronic control unit: causes said lock-up clutch to engage when the vehicle speed is at or above a prescribed vehicle speed at which the engine will not stall, after the vehicle has started off; causes said friction-type gear change clutch to disengage and engage whilst said lock-up clutch remains engaged, when changing gear in said gearbox; and permits operation of said exhaust brake device in the range of engagement of said lock-up clutch.

According to this composition, after start up, the lock-up clutch is engaged, and gear changing in the gearbox is performed by disengaging and engaging a friction-type gear switch, as in an manual transmission vehicle, and therefore, the lock-up clutch can be engaged and the exhaust brake device can be used, at low vehicle speeds Moreover, since operation of the exhaust brake device is only permitted when the lock-up clutch is engaged, there is no disparity between the operational indications displayed for the exhaust brake device and the perceptions of the driver.

Furthermore, an input rotation sensor for detecting the number of revolutions of the input shaft of the gearbox may also be provided, the electronic control unit causing said lock-up clutch to engage when the number of revolutions of the input shaft detected by the input shaft rotation sensor exceeds a prescribed value.

Furthermore, the prescribed value of the number of revolutions of the input shaft may be set respectively for each gear level of the gearbox.

BRIEF DESCRIPTION OF THE DRAWINGS

FIG. 4 is a map showing the number of revolutions of the input shaft at which the lock-up clutch is engaged, at respective gear levels.

FIG. 5 is a map showing the number of revolutions of the input shaft at which the lock-up clutch is disengaged, at respective gear levels.

DESCRIPTION OF THE PREFERRED EMBODIMENTS

Preferred embodiments of the present invention are described below with reference to the accompanying drawings.

Figure 1:
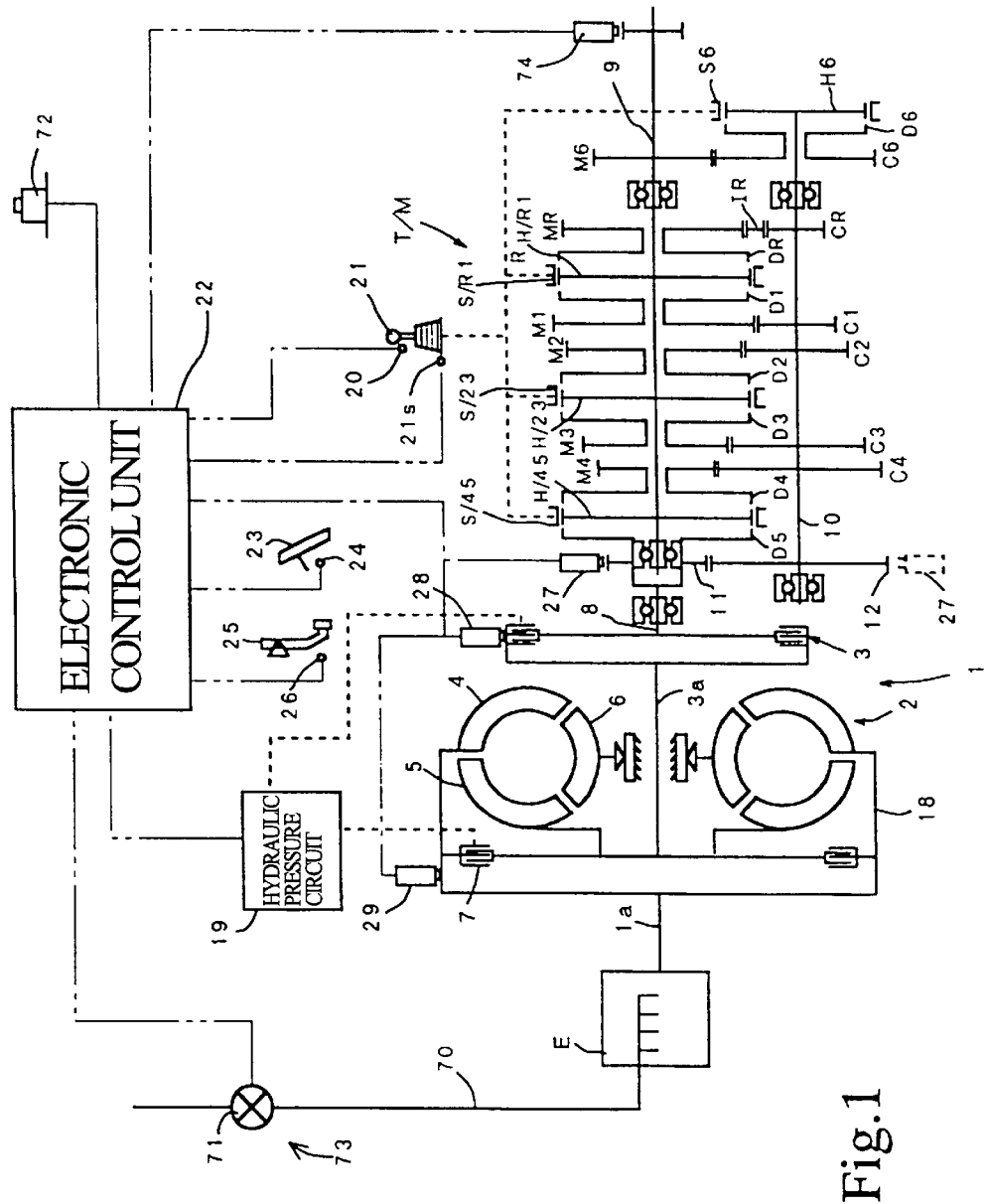
FIG. 1 is a skeleton diagram showing a power transmission device and exhaust brake controller relating to one embodiment of the present invention.

Firstly, the general composition of a power transmission device relating to the present embodiment is described using FIG. 1.

As illustrated in the diagram, a gearbox T/M is connected to the engine E via a clutch mechanism 1. The clutch mechanism 1 comprises a fluid coupling (fluid coupling) 2 and a wet-type multiple-plate clutch (friction type gear change clutch) 3. The fluid coupling 2 is provided in the drive transmission path from the engine E to the gearbox T/M, on the upstream side thereof, and the wet-type multiple-plate clutch 3 is provided in series on the downstream side thereof. Reference here to a "fluid coupling" is a broad concept covering torque converters, and in the present embodiment, a torque converter is used.

The fluid coupling 2 comprises: a pump section 4 which rotates integrally with a casing 18 connected to the output shaft (crank shaft) 1a of the engine E; a turbine section 5 connected to the input side of the clutch 3 which opposes the pump section 4 inside the casing 18; and a stator section 6 interposed between the turbine section 5 and pump section 4. In this fluid coupling 2, there is also provided a lock-up clutch for mechanically disengaging or engaging the pump section 4 and turbine section 5, and this lock-up clutch 7 is operated by hydraulic pressure from a hydraulic pressure circuit 19.

The input side of the wet-type multiple-plate clutch 3 is connected via an input shaft 3a to the turbine section 5, and the output side of the clutch 3 is connected to the input shaft 8 of the gearbox T/M, whereby the clutch 3 can disengage and engage the fluid coupling 2 and gearbox T/M, the clutch being pressed constantly in the disengage direction by means of a spring (not illustrated), and being caused to engage by means of hydraulic pressure from the hydraulic pressure circuit 19.

The gearbox T/M comprises an input shaft 8, an output shaft 9 disposed coaxially with same, and a subsidiary shaft 10 disposed in parallel with same. A main input gear 11 is provided on the input shaft 8. A first-speed main gear M1, second-speed main gear M2, third-speed main gear M3, fourth-speed main gear M4, and a reverse main gear MR are respectively supported axially on the output shaft 9, and a sixth-speed main gear M6 is provided separately. A secondary input gear 12 which meshes with the input main gear 11, a first-speed secondary gear C1 which meshes with the first-speed main gear M1, a second-speed secondary gear C2 which meshes with the second-speed main gear M2, a third-speed secondary gear C3 which meshes with the third-speed main gear M3, a fourth-speed secondary gear C4 which meshes with the fourth-speed main gear M4, and a reverse secondary gear CR which meshes with the reverse main gear MR via an idle gear IR, are provided separately on the subsidiary shaft 10, and a sixth-speed secondary gear C6 which meshes with the sixth-speed main gear M6 is supported axially thereon.

According to this gearbox T/M, when a sleeve S/R 1 which spline meshes with a hub H/R 1 fixed on the output shaft 9 is spline meshed with the dog DR of the reverse main gear MR, then the output shaft 9 rotates in reverse, and when the aforementioned sleeve S/R 1 spline meshes with the dog D1 of the first-speed main gear M1, then the output shaft 9 rotates at a first-speed ratio. When the sleeve S/23 spline meshed with the hub H/23 fixed to the output shaft 9 is spline meshed with the dog D2 of the second-speed main gear M2, then the output shaft 9 rotates at a second-speed ratio, and when the aforementioned sleeve S/23 is spline meshed with the dog D3 of the third-speed main gear M3, then the output shaft 9 rotates at a third-speed ratio.

When the sleeve S/45 spline meshed with the hub H/45 fixed to the output shaft 9 is spline meshed with the dog D4 of the fourth-speed main gear M4, then the output shaft 9 rotates at a fourth-speed ratio, and when the aforementioned sleeve S/45 is spline enmeshed with the dog D5 of the input main gear 11, then the output shaft 9 rotates at a fifth-speed ratio (directly coupled). When the sleeve S6 spline meshed with the hub H6 fixed to the subsidiary shaft 10 is spline meshed with the dog Designated plane 6 of the sixth-speed gear C6, then the output shaft 9 rotates at a sixth-speed ratio.

The aforementioned sleeves S are operated manually by means of a shift lever 21 in the driving cabin, via shift forks and shift rods (not illustrated).

A knob switch 20 is provided on the shift lever 21. In other words, in the present embodiment, in order to detect the start time of the gear change operation by the driver, or to determine the timing at which to start disengagement of the clutch 3, a shift knob is provided on the shift lever 21 in the driver's cabin, in such a manner that it can be rocked slightly in the shift direction with respect to the lever, and the knob switch 20 is provided with this lever and shift knob. When the driver performs a gear change operation, if the shift knob rocks before the lever is operated, then the knob switch 20 turns on, and upon this signal, a clutch disengagement operation is started.

The neutral state or gear level instructed by operation of the shift lever 21 is detected by in gear detecting means 21s, and the neutral or gear level state thus detected is input to an electronic control unit 22.

Furthermore, the amount of depression of the accelerator pedal 23 is detected by a sensor 24, and this amount of depression is input to the electronic control unit 22. Moreover, the amount of depression of the brake pedal 25 is detected by a sensor 26 and this amount of depression is input to the electronic control unit 22.

An input shaft rotation sensor 27 for detecting the number of revolutions of the input shaft 8 of the gearbox T/M is provided on the main input gear 11 of the gearbox T/M or the secondary input gear 12 which meshes with the main input gear 11, a turbine section rotation sensor 28 for detecting the number of revolutions of the turbine section 5 is provided on the input side of the wet-type multiple-plate clutch 3, an engine rotation sensor 29 for detecting the number of revolutions of the engine E is provided on the casing 18 connected to the output shaft 1a of the engine E, and a vehicle speed sensor 74 for detecting the vehicle speed is provided on the output shaft 9 of the gearbox T/M. The detection values of these sensors 27, 28, 29, 74 are input to the electronic control unit 22.

Figure 2:
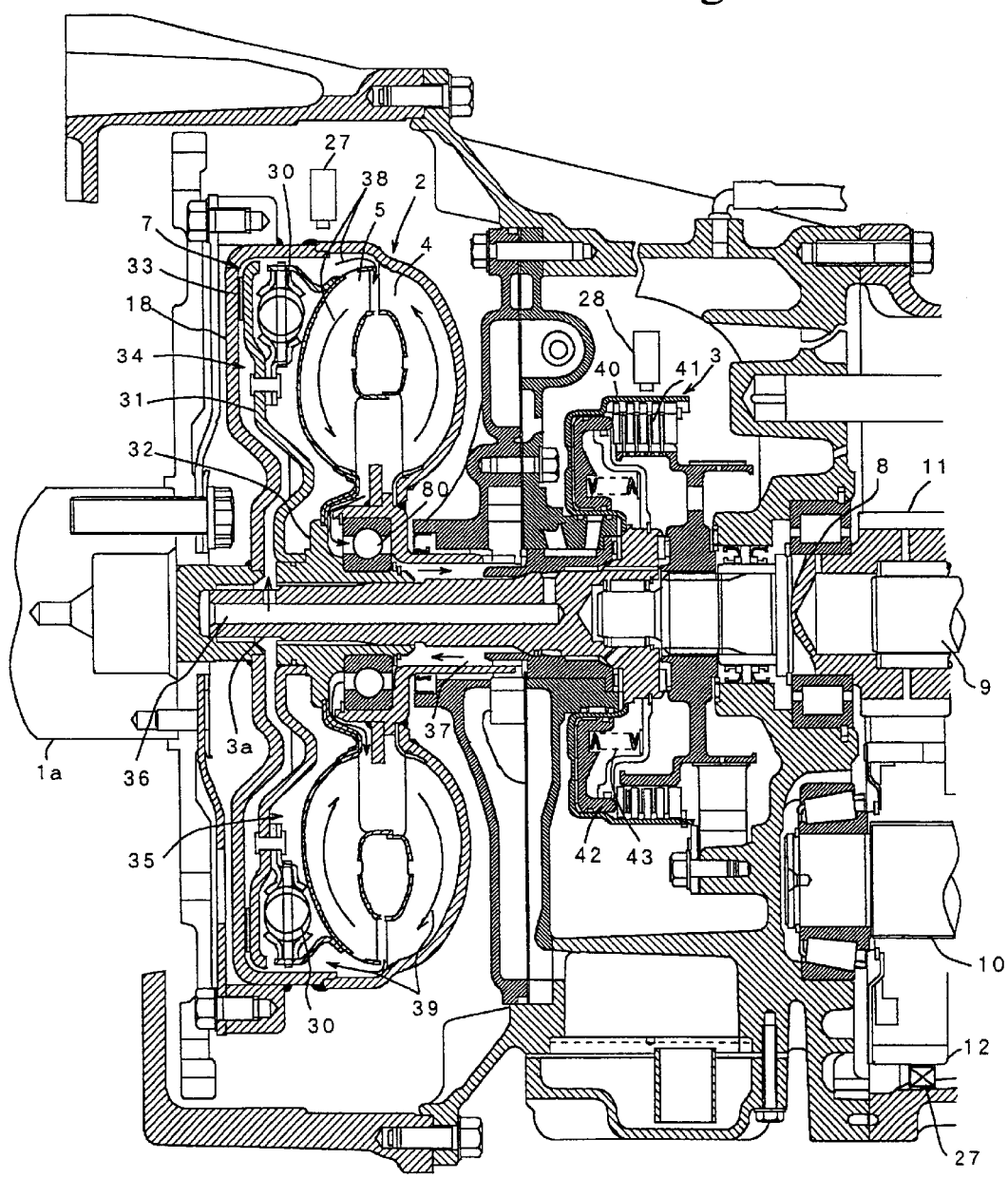
FIG. 2 is a sectional view of a power transmission device relating to one embodiment of the present invention.

Next, the details of the fluid coupling 2 and the lock-up clutch 7 are described according to FIG. 2.

In this diagram, the pump section 4 is provided integrally on the casing 18 connected to the output shaft (crank shaft) 1a of the engine E. The pump section 4 is provided rotatably with respect to the input shaft 3a of the wet-type multiple-plate clutch (friction-type gear change clutch) 3 by means of a bearing 80. Moreover, the turbine section 5 is provided in connection with the input shaft 3a of the clutch 3, in an opposing position to the pump section 4. In the diagram, for the sake of convenience, the stator section 6 has been omitted.

A clutch disc 31 is coupled via a damper spring 30 to the turbine section 5. The clutch disc 31 is provided in such a manner that it can rotate with respect to the outer circumference of the turbine hub 32 of the turbine section 5, and slide in the axial direction, so as to oppose the casing 18, and a clutch facing 33 is provided on the outer face of the clutch disc 31 oriented towards the casing 18.

By means of this clutch disc 31, an outer chamber 34 is formed between the casing 18 and the clutch disc 31, and an inner chamber 35 is formed between the turbine section 5 and the clutch disc 31.

An inner passage 36 is formed in the input shaft 3a, and an outer passage 37 is formed on the outer circumference of the input shaft 3a.

In this fluid coupling 2, when the lock-up clutch 7 is disengaged, hydraulic oil is caused by the electronic control unit 22 to flow from the inner passage 36 into the outer passage 34 between the casing 18 and the clutch disc 31, and it then flows from the outer chamber 34 into the turbine section 5 and pump section 4, as indicated by the arrow 38 in the upper half of the diagram, thereby transmitting the rotation of the pump section 4 to the turbine section 5, a portion of the oil then flowing via the bearing 80 into the outer passage 37. Moreover, when the lock-up clutch 7 is engaged, the flow of hydraulic oil is switched to the reverse path to that described above. In other words, the hydraulic oil flows from the outer passage 37, via the bearing 80 and into the pump section 4 and turbine section 5, as indicated by the arrow 39 in the lower half of the diagram, whereupon it flows into the inner chamber 35. Thereby, the clutch disc 31 is caused to press against the casing 18 by the hydraulic oil in the inner chamber 35, the clutch facing 33 makes friction contact with the casing 18, and the rotation of the casing 18 is transmitted to the turbine section 5 by the clutch disc 31, via the damper spring 30, thereby connecting the pump section 4 and turbine section 5 into a single body.

Mutually separate clutch plates 41 each comprising a plurality of plates are spline meshed on the input side and output side of the wet-type multiple-plate clutch 3 inside an oil-filled clutch casing 40, and by pressing these clutch plates 41 together, or separating same, by means of a clutch piston 42, the clutch is disengaged or engaged. The clutch piston 42 is pressed constantly to the disengage side by a clutch spring 43, and if hydraulic pressure exceeding this force is applied to the clutch piston 42, then the clutch 3 is engaged.

Figure 3:
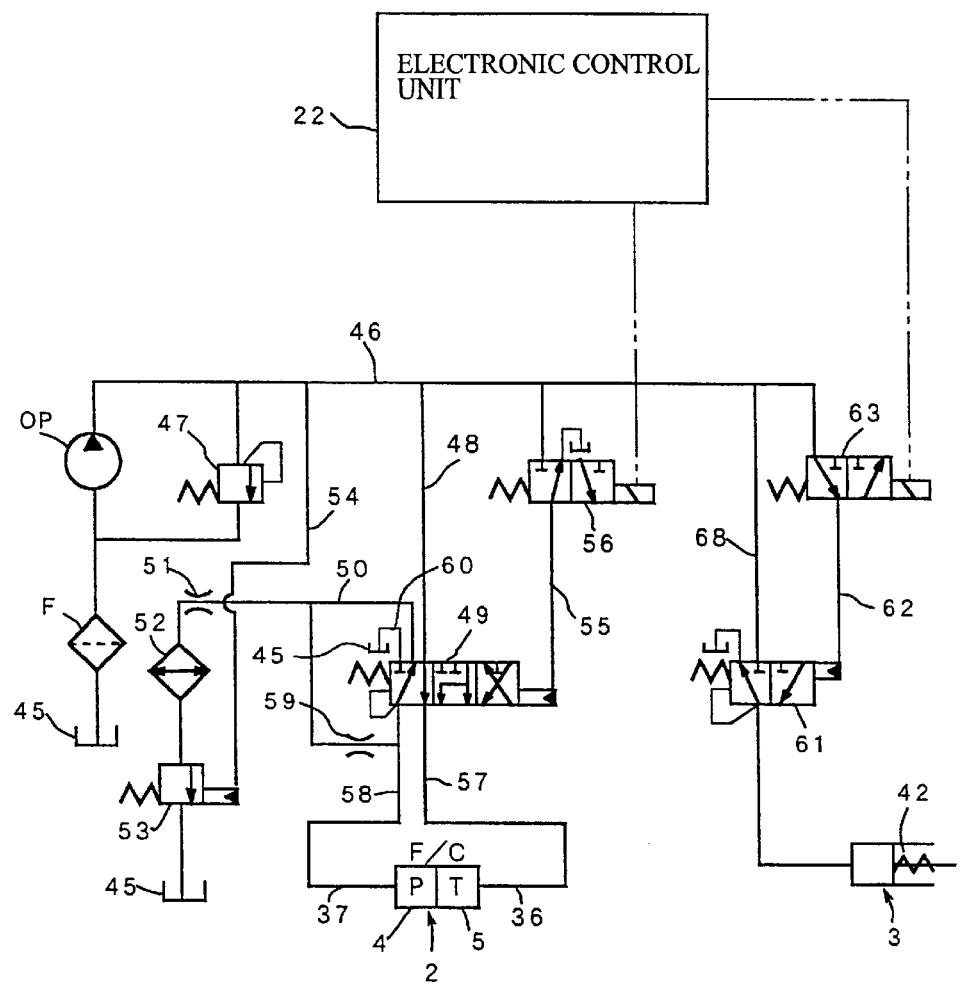
FIG. 3 is a detailed diagram of the oil pressure circuit in FIG. 1.

FIG. 3 shows the details of the hydraulic circuit 19 for controlling the fluid coupling 2, lock-up clutch 7 and wet-type multiple-plate clutch 3.

As shown in the diagram, oil inside an oil tank 45 is drawn in and expelled by means of a hydraulic pump OP, via a filter F, and the oil expulsion pressure is adjusted by a relief valve 47, whereby hydraulic oil of a prescribed pressure is supplied to the hydraulic oil supply line 46.

A lock-up four-way valve 49 for switching the hydraulic oil supply to the fluid coupling 2 is connected to the hydraulic oil supply line 46, by means of a line 48. An oil return line 50 for returning the hydraulic oil to the oil tank 45 is connected to the lock-up four-way valve 49, and an aperture valve 51, cooler 52 and open/shut valve 53 are connected to the oil return line 50.

The open/shut valve 53 is normally closed, and is opened by means of hydraulic oil from a pilot line 54 connected to the hydraulic oil supply line 46.

The lock-up four-way valve 49 is controlled and switched by means of a pilot control two-way electromagnetic valve 56 connected to the pilot line 55 of the hydraulic oil supply line 46. Normally, the pilot control two-way electromagnetic valve 56 is off, and the hydraulic oil from the line 48 flows via line 57 through the inner passage 36 illustrated in FIG. 2 and into the outer chamber 34, and it then flows into the turbine section 5 and pump section 4, whereupon the oil passes from the outer passage 37, via the line 58 and the lock-up four-way valve 49, and returns to the line 50. Consequently, the lock-up clutch is disengaged.

If the pilot control two-way electromagnetic valve 56 is activated, then the lock-up four-way valve 49 is switched by the hydraulic oil from the pilot line 55, and the hydraulic oil from line 48 flows via line 58 into the outer passage 37, and passes into the pump section 4 and turbine section 5, whereupon it becomes confined inside the inner chamber 35, the confined hydraulic oil causing the clutch disc 31 to press against the casing 18. The oil in the outer chamber 34, on the other hand, is forced out into line 57, passes through the lock-up four-way valve 49, and is returned to the oil tank 45 via the oil return line 60. Consequently, the lock-up clutch 7 is engaged.

Moreover, the wet-type multiple-plate clutch 3 is connected to the hydraulic oil supply line 46 by means of a line 68, and clutch switching two-way valve 61 is connected to this line 68, in such a manner that the clutch switching two-way valve 61 is operated and controlled by a pilot control two-way electromagnetic valve 63 connected to the pilot line 62 of the hydraulic oil supply line 46.

This wet-type multiple-plate clutch 3 is normally pressed to the disengage direction by a spring 42, by means of the clutch switching two-way valve 61 being in the closed position. When the pilot control two-way electromagnetic valve 63 is operated to the open position, the clutch switching two-way valve 61 is opened by hydraulic oil from the pilot line 62, and hydraulic oil is supplied to the wet-type multiple-plate clutch 3, thereby actuating it in the engage direction.

The pilot control two-way electromagnetic valves 56, 63 are operated by electrical signal from the electronic control unit 22.

In this power transmission device, the drive of the engine E is transmitted in sequence via the fluid coupling 2, the wet-type multiple-plate clutch 3, and then the gearbox T/M.

The control implemented when the vehicle starts off is described below. Here, it is supposed that the vehicle is stationary in neutral gear, and that the driver seeks to start off by putting the shift lever into a start position. By so doing, the knob switch 20 on the shift lever is turned on by the rocking motion of the shift knob, before the lever is actually operated, and this is taken as a signal to disengage the clutch 3. By the subsequent operation of the shift lever, the gearbox T/M is put to the start gear level, and when this is detected by the in gear detecting means 21s, the clutch 3 is engaged. When the clutch 3 is engaged, the turbine section 5 is halted by braking from the drive wheels, the pump section 4 slides with respect to the turbine section 5 and hence a creeping force is generated. Consequently, when the brake pedal 25 is subsequently released, and the accelerator pedal 23 is depressed, the vehicle starts to move. This point is similarly to a standard automatic transmission vehicle.

After starting off, if the number of revolutions of the engine E detected by the engine rotation sensor 29 exceeds 1000 rpm, and the vehicle speed exceeds a prescribed speed at which the engine will not stall, then the lock-up clutch 7 is engaged, and the pump section 4 and turbine section 5 of the fluid coupling 2 rotate as one body. In other words, the lock-up clutch 7 is engaged when two conditions are satisfied, namely, (1) the number of revolutions of the engine is 1000 rpm or above, and (2) the vehicle speed is at or above a prescribed speed at which the engine will not stall.

The prescribed vehicle speed at which the lock-up clutch 7 is engaged differs according to the gear level of the gearbox T/M, and this point is different to a standard automatic transmission vehicle.

More specifically, in the present embodiment, the number of revolutions of the input shaft 8 at which the lock-up clutch 7 is engaged at each gear level is selected from the map shown in FIG. 4. In other words, in the present embodiment, when the number of revolutions of the input shaft 8 exceeds 900 rpm in any of the gear levels, the lock-up clutch 7 is engaged. Therefore, when travelling in a low-speed gear (for example, the first-speed gear), the lock-up clutch 7 is engaged as a low vehicle speed (for example, 10 kmh), and when travelling in a high-speed gear (or example, the sixth-speed gear), the lock-up clutch 7 is engaged at a medium speed (for example, 40 kmh). Consequently, when travelling in a low-speed gear, the lock-up clutch can be engaged at a low vehicle speed. Here, the number of revolutions of the input shaft of the gearbox T/M indicates the number of revolutions between the output shaft of the fluid coupling 2 and the input shaft 8 of the gear box T/M. Therefore, a rotation sensor may be provided on the output side of the fluid coupling 2, in such a manner that engagement and disengagement of the lock-up clutch 7 is controlled according to the number of revolutions thereof, or a rotation sensor may be provided on the input side or output side of the wet-type multiple-plate clutch 3 in such a manner that it is controlled according to the value of this rotation sensor.

On the other hand, if the vehicle speed falls below the prescribed speed after the lock-up clutch 7 has been engaged, then the lock-up clutch 7 is disengaged.

More specifically, in the present embodiment, the number of revolutions of the input shaft 8 at which the lock-up clutch 7 is disengaged at each gear level is selected from the map shown in FIG. 5. As revealed by a comparison with the map for engagement of the lock-up clutch 7 in FIG. 4, a hysteresis of 100–200 rpm is provided.

Here, the engagement and disengagement timing of the lock-up clutch 7 is described with reference to the timing chart shown in FIGS. 6a–6b.

Figure 6A:
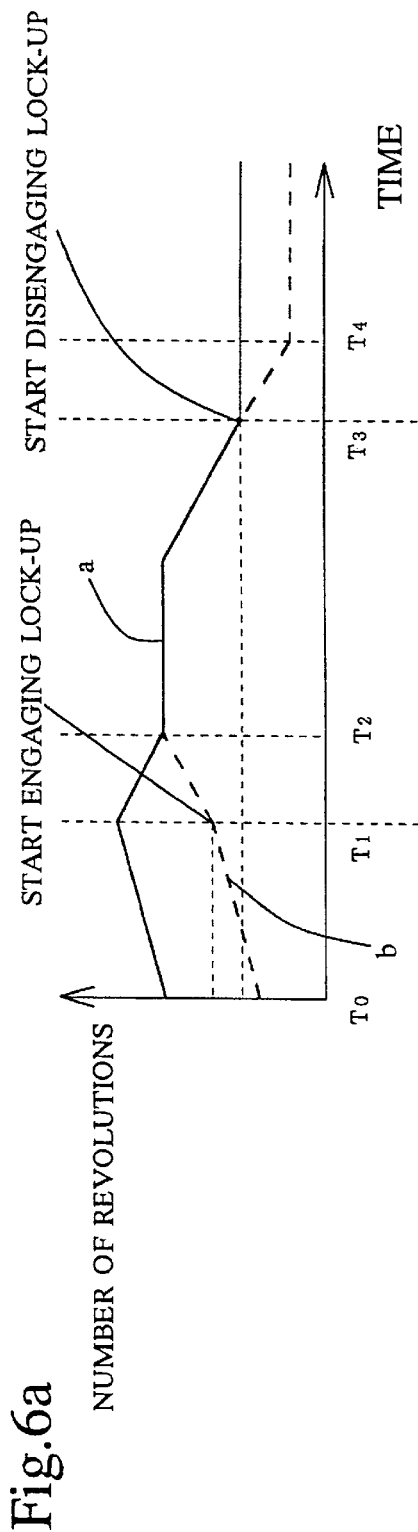
FIG. 6a is a time chart showing the change in the number of revolutions of the engine and the number of revolutions of the input shaft.
Figure 6B:
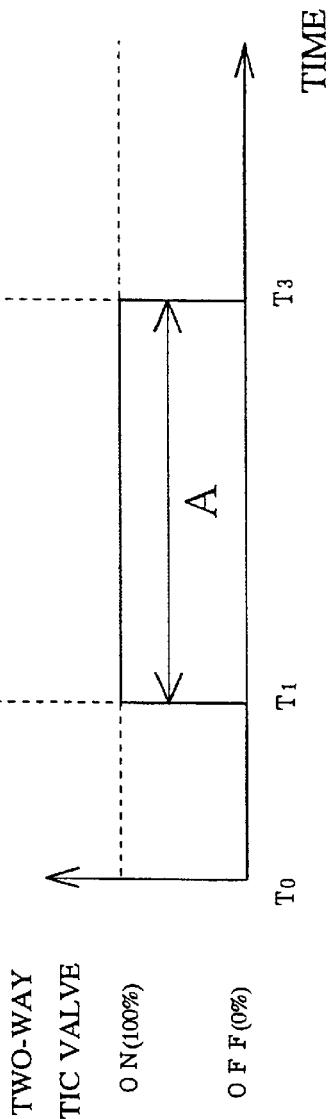
FIG. 6b is a time chart showing the operation of a pilot control two-way electromagnetic value which actuates the lock-up clutch.

In FIG. 6a, the vertical axis indicates the number of revolutions (rpm), and solid line a indicates the number of revolutions of the engine E, and the dotted line b indicates the number of revolutions of the input shaft 8 of the gearbox T/M. FIG. 6b shows the operational timing of ht pilot control two-way electromagnetic valve 56 which operates the lock-up clutch 7.

T0–T1 is the period of acceleration of the vehicle after starting off, and the number of revolutions a of the engine E, and the number of revolutions b of the input shaft 8 have a differential corresponding to the slippage occurring in the fluid coupling 2.

T1 indicates a state where the number of revolutions of the engine E exceeds the prescribed number of revolutions (in the present embodiment, 1000 rpm), and the number of revolutions b of the input shaft 8 has reached the engagement number of revolutions for the current gear level as selected from the map in FIG. 4 (in the present embodiment, 900 rpm). At T1, the pilot control two-way electromagnetic valve 56 switches on and the lock-up clutch 7 is actuated in the engage direction.

T2 indicates a state where the lock-up clutch 7 is completed engaged, and the pump section 4 and turbine section 5 rotated as one body. Therefore, the number of revolutions a of the engine E and the number of revolutions b of the input shaft 8 are equal.

T3 indicates a state where the vehicle speed subsequently falls and the number of revolutions of the input shaft 8 has reached the disengagement number of revolutions for the current gear level, as selected from the map in FIG. 5. At T3, the pilot control two-way electromagnetic valve 56 switches off and the lock-up clutch 7 is operated in the disengage direction.

T4 indicates a state where the lock-up clutch 7 is completely disengaged, and here again, a differential corresponding to the slippage in the fluid coupling 2 arises between the number of revolutions a of the engine E and the number of revolutions b of the input shaft 8.

Next, the operation during gear changing when the vehicle is travelling will be described. Here, it is supposed that the driver attempts to change gear by operating the shift lever 21 to the next gear level, whilst the vehicle is travelling in a prescribed gear level. By so doing, the shift knob rocks before the lever is operated, thereby turning the knob switch 20 on, and this is taken as a signal to disengage the clutch 3. By subsequent operation of the shift lever, the gearbox T/M is put into the next gear level, and when this is detected by the in gear detecting means 21s, the clutch 3 is engaged. Thereby, the sequence of gear changing operations is completed. This clutch engagement and disengagement control is carried out each time the gear is changed, and thereby a clutch engagement and disengagement operation similar to that of a normal manual transmission vehicle is achieved. During gear changing, the lock-up clutch 7 remains engaged and the engine power continues to be transmitted to the clutch 3.

An exhaust brake device combined with a power transmission device of this kind principally comprises an exhaust brake valve (shutter) 71 provided in the exhaust path 70 connected to the exhaust port of the engine E, as illustrated in FIG. 1. Normally (when not braking), the exhaust brake valve 71 is open and the exhaust path 70 is fully opened. During braking, the exhaust brake valve 71 is actuated by a signal from the electronic control unit 22, thereby closing the exhaust path 70 in such a manner that a braking force is applied.

Moreover, an exhaust brake operating switch 72 is provided in the driver's cabin, and the exhaust brake device 73 can be operated by means of the driver switching the exhaust brake operating switch 72 to ON.

Nevertheless, the exhaust brake device 73 is only permitted to operate by the electronic control unit 22 when the permit conditions described below are established. Therefore, even if the driver turns the exhaust brake operating switch 72 on, the exhaust brake device 73 will not operate unless the permit conditions are satisfied.

Moreover, even during operation of the exhaust brake device 73, if the prohibit conditions described below are established, then the electronic control unit 22 halts the operation of the exhaust brake device 73.

Figure 7:
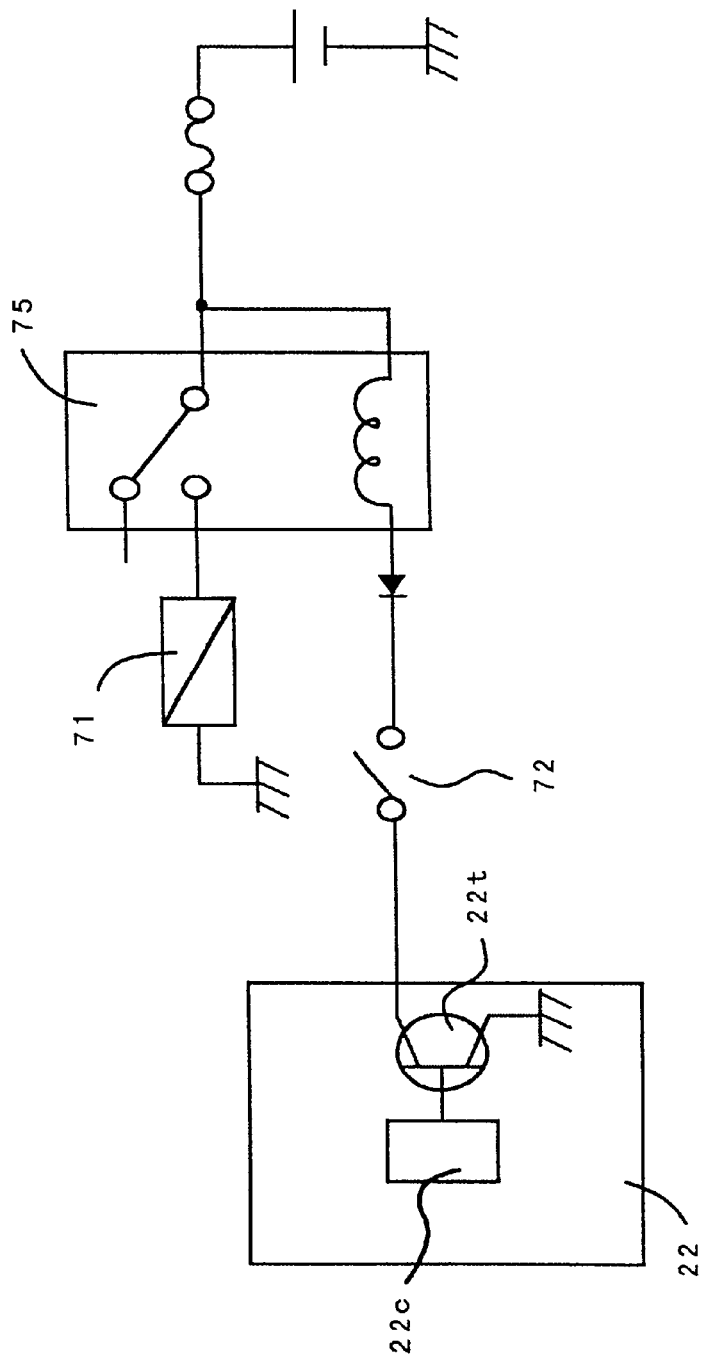
FIG. 7 is a circuit diagram of an exhaust brake device.

The operation of the exhaust brake device 73 is now described with reference to the circuit diagram shown in FIG. 7.

When the following permit conditions are established, the CPU 22c of the electronic control unit 22 switches on a transistor 22t. In this state, if the driver switches on the exhaust brake operating switch 72, then a circuit turns on and a relay 75 is switched on. Consequently, the exhaust brake valve 71 is actuated and the exhaust path 70 is closed, creating a braking force.

The operation permit conditions for the exhaust brake device 73 are described below.

(1) The emergency switch is off.

(2) The accelerator is idle (not depressed).

(3) An emergency disengage (emergency braking) is not in progress.

(4) The number of revolutions of the engine E is 1000 rpm or above.

(5) The number of revolutions of the input shaft 8 is at or above the engagement number of revolutions for the lock-up clutch selected from the map in FIG. 4.

(6) The vehicle speed is 0.5 kmh or above (the vehicle is not stationary).

(7) The clutch is engaged.

(8) The differential between the number of revolutions of the engine E and the number of revolutions of the input shaft is less than 100 rpm.

In the aforementioned conditions, if conditions (1) & (2) & (3) & (4) & (5) & (6) & ((7) or (8)) are established, then operation of the exhaust brake device 73 is permitted. Consequently, when the driver turns on the exhaust brake operating switch 72, the exhaust brake device 73 will operate is these conditions are established.

Here, the most important conditions are (4) and (5), and these conditions are the same as those for engaging the lock-up clutch 7. Consequently, the exhaust brake device 73 is only permitted to operate in the range where the lock-up clutch 7 is engaged, in other words, the region indicated by A in FIG. 6b. Therefore, the exhaust brake device 73 is never operated in cases where the lock-up clutch 7 is disengaged and hence the exhaust brake device 73 would have no effect when operated. Consequently, there is no disparity between the exhaust brake operation indicators and the driver's perceptions.

Moreover, as described above, since the number of revolutions for engaging the lock-up clutch 7 differs according to the gear level, and the lock-up clutch 7 is engaged at a relatively low speed (for example, 10 km/h) when the vehicle is in a low-speed gear, then the exhaust brake device 73 can be used in practice even at low vehicle speeds.

If the engine rotation sensor 29 is judged to be faulty, then condition (4) is omitted. Moreover, if the input shaft rotation sensor 27 is judged to be faulty, then condition (5) is omitted.

Next, the operation prohibit conditions for the exhaust brake device 73 are given below.

(1) The emergency switch is on.

(2) The accelerator is depressed. More specifically, the accelerator opening detected by the sensor 24 is more than 5%.

(3) An emergency disengage (emergency braking) is in progress.

(4) The vehicle speed sensor 74 is normal.

(5) The vehicle speed is 0.5 kmh or above.

(6) The clutch is not completely engaged.

(7) The input shaft rotation sensor 27 is normal.

(8) The number of revolutions of the input shaft 8 is below the disengagement number of revolutions for the lock-up clutch selected from the map in FIG. 5.

Of the foregoing conditions, if condition (1) or (2) or (3) or ((4)&(5)& ((6) or ((7)&(8)))) is established, then operation of the exhaust brake device 73 is not permitted. Consequently, even if the driver turns on the exhaust brake operating switch 72, the exhaust brake device 73 will not operate and no exhaust brake operation indicator will be displayed. Moreover, if the prohibit conditions are established during operation of the exhaust brake device 73, then the operation of the exhaust brake device 73 is halted.

If the vehicle sensor 74 is judged to be faulty, then the judgement in condition (4) of whether the vehicle speed is 0.5 kmh or above is replaced by a condition of whether the number of revolutions of the input shaft 8 is 100 rpm or above.

In this way, the present invention allows the lock-up clutch 7 to be engaged at low vehicle speed, and moreover, the problems described previously are resolved by matching the engagement region of the lock-up clutch 7 with the permitted operation region of the exhaust brake device 73.

In the present embodiment, hydraulic oil was used to provide fluid pressure, but it is also possible to use fluid pressure, such as air pressure, or the like.

As described above, according to the present invention, the following excellent merit is obtained.

1) An exhaust brake device can be used in practice at low vehicle speeds.

What is claimed is:

1. A controller for an exhaust brake device combined with a power transmission device provided with a fluid coupling connected to an output shaft of an engine, a friction-type gear change clutch interposed between said fluid coupling and a gearbox, and a lock-up clutch provided in said fluid coupling for mechanically engaging and disengaging the input and output side of said fluid coupling, wherein said controller comprises an electronic control unit for controlling the engagement and disengagement of said friction-type gear change clutch, the engagement and disengagement of said lock-up clutch, and the operation of said exhaust brake device; and wherein said electronic control unit:
causes said lock-up clutch to be engaged when the vehicle speed is at or above a prescribed vehicle speed at which the engine will not stall, after the vehicle has started off;
causes said friction-type gear change clutch to be engaged or disengaged whilst said lock-up clutch remains engaged, when changing gear in said gearbox; and
prohibits operation of said exhaust brake device outside the range of engagement of said lock-up clutch.

2. The controller for an exhaust brake device according to claim 1, further comprising an input shaft rotation sensor for detecting the number of revolutions of the input shaft of said gearbox;

wherein said electronic control unit causes said lock-up clutch to be engaged when the number of revolutions of said input shaft as detected by said input shaft rotation sensor exceeds a prescribed value.

3. The controller for an exhaust brake device according to claim 2, wherein the prescribed value for the number of revolutions of said input shaft is set respectively for each gear level of said gearbox.

* * * * *